(12) United States Patent  (10) Patent No.: US 8,990,179 B2
Chan et al.                (45) Date of Patent: Mar. 24, 2015

(54) TIME LIMITED LOCK OWNERSHIP

(71) Applicant: Oracle International Corporation, Redwood Shores, CA (US)

(72) Inventors: Wilson Chan, San Mateo, CA (US); Angelo Pruscino, Los Angeles, CA (US); Michael Zoll, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 13/721,614

(22) Filed: Dec. 20, 2012

(65) Prior Publication Data

US 2013/0111089 A1    May 2, 2013

Related U.S. Application Data

(63) Continuation of application No. 12/340,569, filed on Dec. 19, 2008, now Pat. No. 8,370,318.

(51) Int. Cl.
*G06F 17/30* (2006.01)
*G06F 9/52* (2006.01)

(52) U.S. Cl.
CPC ............ *G06F 9/52* (2013.01); *G06F 17/30362* (2013.01)

USPC .......................................... 707/704; 710/200

(58) Field of Classification Search
None
See application file for complete search history.

(56) References Cited

U.S. PATENT DOCUMENTS

| 5,534,823 | A  | * | 7/1996 | Kondou ........................ 331/16 |
| 5,715,447 | A  | * | 2/1998 | Hayashi et al. ................... 1/1 |
| 7,313,557 | B1 |   | 12/2007 | Noveck |
| 7,343,432 | B1 | * | 3/2008 | Niver et al. ................... 710/36 |
| 8,370,318 | B2 |   | 2/2013 | Chan et al. |
| 2005/0216461 | A1 |   | 9/2005 | Williams et al. |
| 2009/0193425 | A1 | * | 7/2009 | McLean et al. .............. 718/104 |
| 2011/0113428 | A1 |   | 5/2011 | Nelson et al. |

* cited by examiner

*Primary Examiner* — Belix M Ortiz Ditren
(74) *Attorney, Agent, or Firm* — Hickman Palermo Truong Becker Bingham Wong LLP (57) ABSTRACT

Described herein are techniques for time limited lock ownership. In one embodiment, in response to receiving a request for a lock on a shared resource, the lock is granted and a lock lease period associated with the lock is established. Then, in response to determining that the lock lease period has expired, one or more lock lease expiration procedures are performed. In many cases, the time limited lock ownership may prevent system hanging, timely detect system deadlocks, and/or improve overall performance of the database.

20 Claims, 3 Drawing Sheets

TIME LIMITED LOCK OWNERSHIP

CROSS-REFERENCE TO RELATED APPLICATIONS; BENEFIT CLAIM

This application is a Continuation of U.S. patent application Ser. No. 12/340,569, filed Dec. 19, 2008, the entire contents of which is hereby incorporated by reference for all purposes as if fully set forth herein. The Applicants hereby rescind any disclaimer of claim scope in the parent application or the prosecution history thereof and advise the USPTO that the claims in this application may be broader than any claim in the parent application.

FIELD OF THE INVENTION

The present invention relates to time limited lock ownership in computer systems, and in particular, to establishing lock lease periods associated with granted locks and performing lock lease expiration procedures upon the expiration of the lock lease periods.

BACKGROUND OF THE INVENTION

Computer processes running in a multi-processing system often compete for "shared resources" available in the multi-node system. Examples of shared resources may include volatile or non-volatile storage media, shared printers, shared scanners, or other input/output devices.

Requests from the processes may be coordinated using "locks." Once an appropriate lock is granted to the process, the process may access the shared resource, and use the resource until, for example, the lock is relinquished, revoked, or otherwise terminated.

"Lock-based" system may include two types of locks: locks permitting concurrent access to a shared resource, and locks permitting exclusive access to the shared resource. For example, a "shared read lock" may be granted to one or more processes to allow the processes to concurrently read data from a persistent storage, whereas an "exclusive write lock" may be granted only to one process at the time, and to allow only one process at the time to write data to, for example, a persistent data storage medium.

Once an appropriate lock is granted to the process, the process may hold on to the lock until the process decides to release the lock. On occasion, the process may hold on to the lock even if the process does not need the lock any more.

The process may continue holding on to the lock for various reasons. For example, the process may hold on to the lock to avoid a time consuming procedure of reapplying for the lock. When the process anticipates that it may need the lock some time in the near future, instead of relinquishing the lock and then reapplying for it, the process may just continue holding on to the lock. However, such anticipation may be false, and the process may end up holding on to the lock but have no actual need for it in the future.

A process may also hold on to the lock because the process simply "forgot" to release the lock. This may occur in cases of poorly written process handlers, or complex multi-process-applications.

When one process holds on to the lock, other processes may have to wait until the lock is released before they can receive the lock. This dependency may be particularly inconvenient to the processes in multi-node systems competing for an exclusive lock.

In current implementations, a distributed lock manager (DLM) may be used as a mediator between the process holding a lock and processes requesting the lock. A DLM may operate in a number of modes. For example, in case of an "exclusive lock" mode, a DLM may use a blocking asynchronous system trap (BAST) function to request the process holding on to the lock to release the lock because other processes are waiting for that very same lock. This function provides a mechanism for sending a message to the process holding on to the lock to request a lock release.

However, even upon receiving such a request, it is still up to the process holding on to the lock to decide whether to release the lock. For example, the process holding on to the lock may ignore all BAST requests, and continue holding on to the lock despite receiving numerous BAST requests.

Some processes holding on to the lock may consider BAST requests, but may continue holding on to the locks for optimization reasons described above.

In some situations, even if a process holding on to a first lock receives a BAST request, the process may be unable to release the first lock because the release of the first lock depends on receiving a second lock for a shared resource. Situations where one process holds on to the first lock and cannot release the first lock unless it receives the second lock held by a second process which awaits the first lock may lead to system deadlocks, system "hanging," and other system execution errors.

When a requesting process requests the lock held by another process, the requesting process may set up a timer that can be used to determine how long the requesting process will wait for the lock. In this situation, upon the expiration of the timer, the requesting process may just give up the wait for the lock. In such a case, the requesting process may never receive the lock and may never finish its task.

There are mechanisms for detecting deadlocks caused by the processes that are not willing to release their locks. However, these mechanisms are helpful to detect a deadlock after the deadlock actually occurs, but they are less helpful in preventing deadlocks from happening.

Inability to coordinate access to lock among multiple processes may slow down overall system performance because most of the time, the processes hold on to their locks longer than they should, causing various problems, such as timeouts, deadlocks, and system "hanging." Those problems are usually difficult to detect and debug. Moreover, these problems may spur a sequence of complicated "chain" reactions within the multi-node systems.

As clearly shown, techniques are needed to manage how a process may hold on to a lock in a multi-process system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A computer-implemented method for time limited lock ownership is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques for time limited lock ownership. In many cases, by using the time limited lock ownership, occurrences of system hanging and deadlocks may be prevented, or at least timely detected.

Illustrative Operating Environment

According to an embodiment of the present invention, the techniques may be performed by a multi-node database server. A multi-node database server comprises multiple database instances running on a group of interconnected nodes managing access to a database. The nodes in the group may be in the form of computers (e.g. work stations, personal computers) interconnected via a multi-node system. Alternatively, the nodes may be the nodes of a grid, where each node is interconnected on a rack. The grid may host multiple multi-node database servers. However, the present invention is not limited to a multi-node database server, any particular type of server, and any type of architecture.

One or more database servers may manage a database. A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement.

For the database server to process the database statements, the database statements must conform to a database language supported by the database server. One non-limiting database language supported by many database servers is SQL, including proprietary forms of SQL supported by such database servers as Oracle, (e.g. Oracle Database 10g). SQL data definition language ("DDL") instructions are issued to a database server to create or configure database objects, such as tables, views, or complex data types.

Lock Lease Period

The techniques presented herein are based on the concept of a "lock lease period." The lock lease period is an amount of time that is associated with a lock at the time the lock is granted to a lock-requesting process. In effect, a lock-requesting process leases the lock until the "lock lease period" expires, or until some action is taken causing the lock to be relinquished.

According to an embodiment, a computer-implemented method comprises: requesting a lock on a shared resource; in response to receiving a request, granting said lock on said shared resource to a lock holder, and establishing a lock lease period associated with said lock; determining that the lock lease period has expired; and in response to determining that the lock lease period has expired, performing one or more lock lease expiration procedures.

Various types of information and characteristics may be taken into consideration in establishing the length of the lock lease period associated with the lock. For example, the length of the lock lease period associated with the lock may depend on the information included in the lock request, information about the process that requested the lock, information pertaining to the requested shared resource and information about other resources and processes in the multi-node system. The length of the lock lease period may also depend on the policies implemented in the system and other characteristics of the system components.

Lock lease periods associated with the lock may be established by various entities. For example, the lock lease period associated with the lock may be established by the lock holding process itself, or by an agent servicing the lock holding process. The lock lease period may also be established by a distributed lock manager (DLM). In addition, the lock lease period may be established based on input provided by a system administrator or other authorized personnel. Moreover, the lock lease period may be established individually for each lock-requesting process, or may be established system-wide, that is, in a similar fashion for all lock-requesting processes.

Various lock lease expiration procedures may be implemented in the time limited lock ownership scheme. For example, once the lock lease period associated with the lock expires, the lease period may be extended so that the holder of the lock may continue holding on to the lock for some additional period of time. In some situations, upon expiration of the lock lease period, the grant of the lock may be terminated and the lock may be relinquished by or from the process. Also, upon expiration of the lock lease period, diagnostic data about the lock holder, the shared resources and/or other shared resources may be collected and stored. Furthermore, the lease on the lock may be renewed for a new lock lease time period associated with the lock.

The concept of the time limited lock ownership may apply to various database system environments. For example, the time limited lock ownership may be implemented to manage global locks in a cluster database environment.

The time limited lock ownership may be implemented with respect to various shared resources. For example, the lock leasing concept may apply to managing access to volatile or non-volatile storage resources, printers, scanners, and other shared resources that might be available in a cluster system or systems.

Time Limited Lock Ownership

Time limited lock ownership scheme is based on the concept of leasing the lock to a process for some period of time. According to an embodiment, a process that was granted a lock on a shared resource receives only a "lease" on the lock, not an ownership of the lock. Such a process may only "lease" the lock, but does not actually own the lock. Therefore, just as typical leasehold may be terminated under certain circumstances, the lock leasehold may be terminated as well.

Granting only leasehold allows imposing some limitation on the usage of the lock. For example, the lease of the "lock" may include a time limit on the usage of the lock by the process. The ability to confine the process to use the lock only during certain time interval implies that the grant of the lock is only a lease of the lock, and that the lease comes with only time-limited lock ownership.

Figure 1:
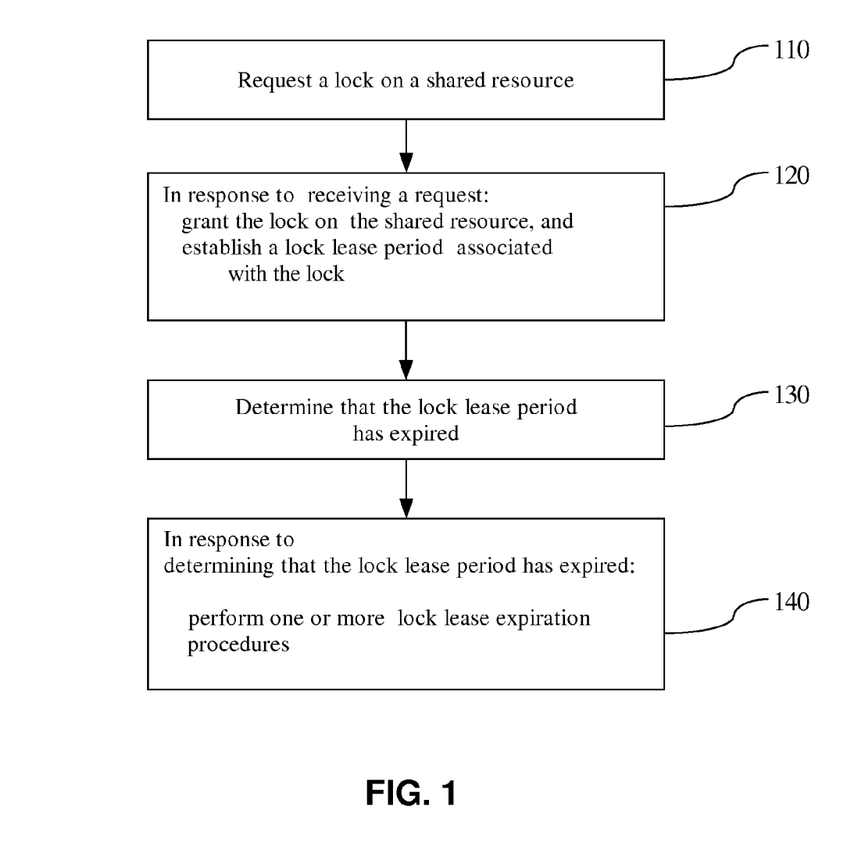
FIG. 1 is a flow chart depicting a process of managing time limited lock ownership according to an embodiment of the present invention.

FIG. 1 is a flow chart depicting a process of managing time limited lock ownership according to an embodiment of the present invention. In step 110, a process requests a lock on a shared resource. The process may be any of the processes executed in a multi-node system.

The process may request any type of the lock. The process may request a lock on any type of shared resources. For example, the process may request access to shared memory or a non-volatile data storage device. Moreover, the process may request access to a shared printer, a shared scanner or other shared data input/output devices.

The request for a lock on the shared resource may be directed to an agent servicing the particular process. According to another example, the request may be directed to DLM, which can be a centralized unit capable of handling lock requests from various processes in the multi-node system Upon receiving a request for a lock on a shared resource from a process, the DLM determines whether the requested lock may be granted to the requesting process.

If for some reason the lock on the particular shared resource cannot be granted to the requesting process, then a request rejection message may be sent to the requestor. However, if the lock may be granted, the method proceeds to step 120.

In step 120, in response to receiving a lock request on a shared resource, the lock is granted to the requesting process. However, the grant of the lock does not convey a "lock ownership." Instead, the lock grant conveys only "leasehold" on the lock.

Methods of Setting a Lock Lease Period

Various types of information may be used to determine a duration of the lock lease period. For example, the lock lease period associated with the lock may be established based on information included in the lock request, information about the process that requested the lock, and/or information about the requested shared resource. The lock lease period may also be established based on the policies governing the usage of the shared resource, the policies governing the processes in the computer system and other policies available in the system at the time the lock lease period is established.

According to one example, if a process requests a lock to perform an input/output (I/O) function, then the lock lease period associated with the lock may be set to e.g., 100 ms. Establishing the lock lease period to perform an I/O function within a 100 ms long time interval means that the process that was granted the lock to perform that I/O function is actually "leasing" the lock for 100 ms and is expected to finish the I/O operation upon the expiration of the 100 ms long time interval. In most implementations, the 100 ms time interval is sufficient to perform a typical I/O function. Therefore, in such implementation, establishing the 100 ms long time interval is over-inclusive and assigns a more generous lease lock period than it is necessary.

The lock lease period associated with the lock may be established by various entities. For example, the lock lease period may be established by the lock holder itself. In another situation, the lock lease period may be established by an agent servicing the lock request received from the lock requestor.

The lock lease period may be customized according to the requestor's requirements, and may depend on the characteristics of the requestor, the requested shared resource, the type of lock, and the type of operation that the requestor wants to perform. The lock lease period may also depend on the database configuration, availability of the shared resource at the particular moment, and other polices and characteristics known to the agent at the particular point in time.

The lock lease period associated with the lock may also be established system-wide. In this situation, rules governing the establishment of the lock lease periods may be uniformly applied to all lock lease periods, or to all lock lease periods within groups of lock requests. Uniformly applied rules may not take into consideration specific characteristics of the request, requested shared resources, overall system performance at the particular moment, and other information. For example, each time a process requests a lock to perform an I/O operation, the process may receive only e.g. 100 ms long lock lease period associated with the lock, regardless of the type of I/O operation.

Lock lease period schemes may also be hybrids between customized and system-wide schemes. For example, if a locally set lock lease period reaches some threshold value, then the lock lease period may be set or reset by the system. In this situation, the locally established lock lease periods are overseen by a centralized "checking" system, which limits lock lease periods to threshold values acceptable by the system.

If two or more lock lease periods appear to be set to the same lock, the lock lease periods may be ordered according to policies and priorities. For example, various system policies pertaining to the lock lease periods may be implemented. One of such policies was described above and pertains to allowing the lock lease periods being set locally as long as the periods do not exceed predetermined threshold values; otherwise, the locally established lock lease periods are adjusted by the system to the predetermined thresholds. According to this policy, system's settings may trump the settings established by the individual processes or agents.

Lock lease periods may also be set in such a way so that every occurrence of system "hanging" has to be resolved within at most, for example, 100 ms. In addition, lock lease periods may be set in such a way that periods for I/O operations may be set to time intervals that are longer than time intervals for CPU time requests. Moreover, lock lease periods for processes handling system security matters may be longer than lock lease periods for processes requesting access to a volatile memory.

Other policies may be taken into consideration in establishing lock lease periods. These polices may pertain to network security, daemons, and other rules for handling data communications.

Methods for Adjusting a Lock Lease Period

The lock lease period may be adjusted dynamically. In some situations, a lock lease period set upon granting the lock may be extended beyond the already established lock lease period. For example, if a DLM detects that a particular I/O operation is "slow," a DLM, at its own initiative, may extend the previously established lock lease period. This may be desirable if a particular I/O operation takes longer than a typical I/O operation performed by some other process.

If the requesting process anticipates that it may need a time extension on the lock, the process may request such an extension, and in certain circumstances such an extension may be granted to the process. The certain circumstances may include checking whether other process is waiting for the same lock, whether the shared resource may be used by the same process for the extended period of time, whether granting such an extension complies with the policies implemented by the node in the computer system. For example, if a process requests a lock time extension on the usage of the CPU, such an extension may be given if otherwise the particular CPU would be idle.

In some situations, the lock lease period may be shortened. For example, the lock lease period may be shortened. The lock lease period may also be shortened to avoid system deadlocks, or when a process having a higher priority (e.g. a system process) needs the lock to perform some administrative tasks.

A lock lease period may also be shortened upon receiving a blocking asynchronous system trap (BAST) function. Upon receiving the BAST notification, the process may be requested to relinquish the lock immediately, or within a relatively short period of time.

Expiration of a Lock Lease Period

Referring again to FIG. 1, in step 130, it is determined whether the lock lease period has expired. This determination may be made by a lock holder itself, an agent servicing the lock holder, a DLM, a database server, or a system administrator. Such a determination may require that a process in charge of making such a determination maintains a database of the lock lease periods associated with the granted locks, and periodically checks whether any of the lock lease periods has expired. The database may be maintained locally or system-wide.

Lock Lease Expiration Procedures

Referring to FIG. 1, in step 140, in response to determining that the lock lease period has expired, one or more lock lease expiration procedures are performed. These procedures may be performed by the holder of the lock itself. Alternatively, these procedures may be performed by an agent servicing the client's lock request, a DLM or other process capable of managing locks locally or system-wide. The lock lease expiration procedures are performed to prevent system "hanging," system deadlocks, and/or to execute termination of the lock lease.

Figure 2:
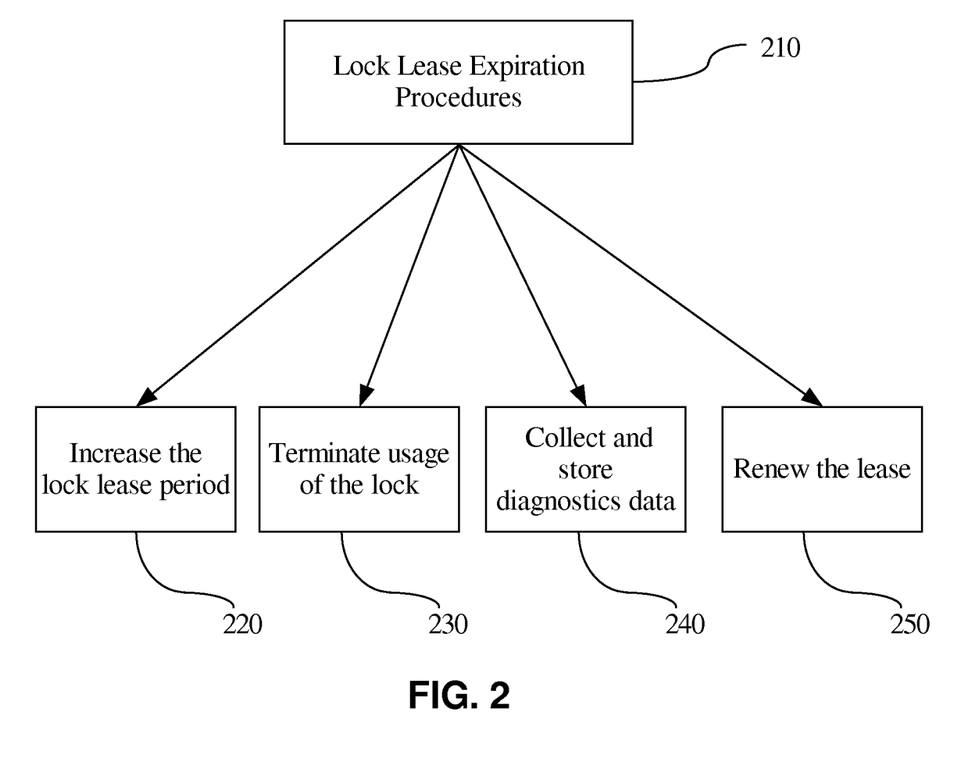
FIG. 2 is a block diagram for lock lease expiration procedures according to an embodiment of the present invention.

FIG. 2 is a block diagram for lock lease expiration procedures according to an embodiment of the present invention. The lock lease expiration procedures may be performed by the lock holding process, or by other processes capable of monitoring the lock lease periods associated with the locks.

There are various types of lock lease expiration procedures 210. For example, one of the lock lease expiration procedures may cause increasing the lock lease period, as illustrated in block 220. According to this example, the lock holding process or other process monitoring the lock, may determine that the lock holder should be allowed to hold on to the lock for an additional time interval.

Such an extension of the lock lease period may occur in situations when there is no other process requesting the particular lock at the moment, or the process holding on to the lock has tried to finish some operation within the allotted lock lease time period, but was interrupted by other processes that actually may wait. The circumstance in which the lock lease period may be increased may be based and/or coordinated with system policies, local policies, security polices, and other polices implemented in the particular computer system.

In some other circumstances, the lock lease expiration procedure may cause termination of usage of the lock by the process, as illustrated in block 230. This procedure may be analogized to terminating the lease on the lock. Upon the expiration of the lock lease period, the process holding on to the lock may be requested to release the lock. Such a request may demand an immediate action, or may give the process holding on to the lock some short time interval to "gracefully" terminate using of the lock.

In some situations, the lock holding process may itself be in charge of terminating its possession of the lock. Upon the expiration of the lock lease period, the lock holding process may immediately relinquish it. Alternatively, the lock holding process may take some short period of time to terminate the usage of the lock and relinquish the lock shortly afterwards.

The lock lease expiration procedures may also include collecting and storing some diagnostic data, stack status, process states, and other information reflecting current state of the system, as illustrated in block 240. This procedure allows collecting and storing data that might be helpful in detecting system "hanging," system deadlocks, and other occurrences of system errors. Accordingly, the collected information may be stored in a non-volatile or volatile storage media, printed out, e-mailed to a system administrator, or stored in any other way in the computer system.

In some situations, the lock lease expiration procedure may cause a renewal of the lease, as illustrated in block 250. As in typical leasehold, the lease on the lock may be renewable. There might be a number of reasons for a lock lease renewal. For example, the renewal may be possible based on the system policy, availability of the requested shared resource, changed circumstances and configuration of the system, and other reasons related to locks and shared resources.

These and other lock lease expiration procedures are designed to manage time limited lock ownership in the computer system. Their purpose is to prevent and detect system "hanging," system deadlocks and other system errors related to locks. They allow collecting information about processes holding on to their locks, monitoring abnormalities associated with lock leases, identifying processes that tend to block other processes from receiving locks and detecting other system "blockers." Implementation of the time limited lock ownership scheme may enable an increase of the overall computer system performance. By imposing lock lease time periods associated with the locks, the processes receive only lock leases and have to comply with the rules imposed by the leases.

Hardware Overview

Figure 3:
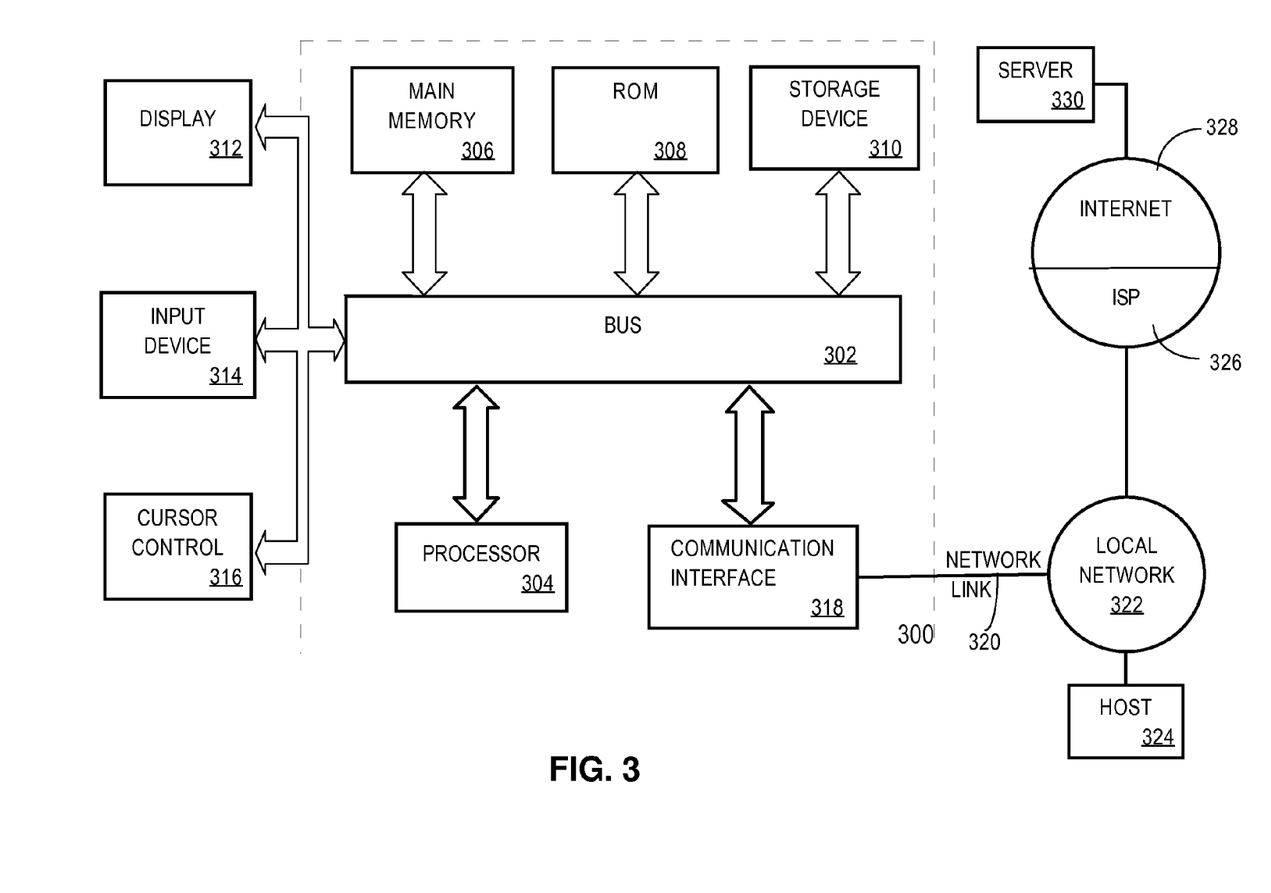
FIG. 3 is a block diagram of a computer system that may be used to implement an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to an embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
receiving a request for a lock on a shared resource;
in response to receiving said request:
 granting said lock on said shared resource to a lock holder, and
 establishing a lock lease period associated with said lock;
determining, based on one or more requests for a lock on said shared resource that are received from other processes executing in a system, that said lock lease period associated with said lock needs to be shortened; and
in response to determining that said lock lease period associated with said lock needs to be shortened, shortening said lock lease period associated with said lock.

2. The computer-implemented method of claim 1, wherein the determining that said lock lease period associated with said lock needs to be shortened comprises determining that said lock lease period needs to be shortened to avoid system deadlocks.

3. The computer-implemented method of claim 1, wherein the determining that said lock lease period associated with said lock needs to be shortened comprises determining that said lock lease period needs to be shortened because a process having a higher priority than said lock holder requested said lock on said shared resource.

4. The computer-implemented method of claim 1, wherein the determining that said lock lease period associated with said lock needs to be shortened comprises determining that said lock lease period needs to be shortened because a notification of a blocking asynchronous system trap (BAST) function was received.

5. The computer-implemented method of claim 1, wherein said lock lease period associated with said lock is established based on any one of: information included in said request, information about said lock holder, and information about said shared resource.

6. The computer-implemented method of claim 1, wherein the establishing the lock lease period associated with said lock is performed by any one of: said lock holder, an agent servicing said lock holder, and a distributed lock manager (DLM).

7. The computer-implemented method of claim 1, further comprising:
for each lock from a plurality of locks, periodically determining whether respective lock lease periods of said plurality of locks have expired; and
in response to determining that said lock lease period associated with said lock granted to said lock holder has expired, performing one or more lock lease expiration procedures.

8. The computer-implemented method of claim 7, wherein the periodically determining whether respective lock lease periods of said plurality of locks have expired is performed by a process that maintains a database of said plurality of locks.

9. The computer-implemented method of claim 7, wherein the performing one or more lock lease expiration procedures comprises performing any one of: increasing said lock lease period associated with said lock, terminating usage of said lock by said lock holder, renewing a grant of said lock on said shared resource to said lock holder, and collecting and storing diagnostic data and stack status information.

10. A non-transitory computer-readable storage medium, storing one or more instructions which, when executed by one or more processors, cause performance of steps comprising:
receiving a request for a lock on a shared resource;
in response to receiving said request:
granting said lock on said shared resource to a lock holder, and
establishing a lock lease period associated with said lock;
determining, based on one or more requests for a lock on said shared resource that are received from other processes executing in a system, that said lock lease period associated with said lock needs to be shortened; and
in response to determining that said lock lease period associated with said lock needs to be shortened, shortening said lock lease period associated with said lock.

11. The non-transitory computer-readable storage medium of claim 10, wherein the instructions that cause performance of the determining that said lock lease period associated with said lock needs to be shortened, further comprise instructions which, when executed by the one or more processors, cause performance of steps comprising: determining that said lock lease period needs to be shortened to avoid system deadlocks.

12. The non-transitory computer-readable storage medium of claim 10, wherein the instructions that cause performance of the determining that said lock lease period associated with said lock needs to be shortened, further comprise instructions which, when executed by the one or more processors, cause performance of steps comprising: determining that said lock lease period needs to be shortened because a process having a higher priority than said lock holder requested said lock on said shared resource.

13. The non-transitory computer-readable storage medium of claim 10, wherein the instructions that cause performance of the determining that said lock lease period associated with said lock needs to be shortened, further comprise instructions which, when executed by the one or more processors, cause performance of steps comprising: determining that said lock lease period needs to be shortened because a notification of a blocking asynchronous system trap (BAST) function was received.

14. The non-transitory computer-readable storage medium of claim 10, wherein said lock lease period associated with said lock is established based on any one of: information included in said request, information about said lock holder, and information about said shared resource.

15. The non-transitory computer-readable storage medium of claim 10, wherein the instructions that cause performance of the establishing the lock lease period associated with said lock, are performed by any one of: said lock holder, an agent servicing said lock holder, and a distributed lock manager (DLM).

16. The non-transitory computer-readable storage medium of claim 10, further comprising instructions which, when executed by the one or more processors, cause performance of steps comprising:
for each lock from a plurality of locks, periodically determining whether respective lock lease periods of said plurality of locks have expired; and
in response to determining that said lock lease period associated with said lock granted to said lock holder has expired, performing one or more lock lease expiration procedures.

17. The non-transitory computer-readable storage medium of claim 16, wherein the instructions that cause performance of the periodically determining whether respective lock lease periods of said plurality of locks have expired, are performed by a process that maintains a database of said plurality of locks.

18. The non-transitory computer-readable storage medium of claim 16, wherein the instructions that cause the performing one or more lock lease expiration procedures further comprise instructions which, when executed by the one or more processors, cause performance of any one step of: increasing said lock lease period associated with said lock, terminating usage of said lock by said lock holder, renewing a grant of said lock on said shared resource to said lock holder, and collecting and storing diagnostic data and stack status information.

19. A method comprising:
receiving a request for a lock on a shared resource;
in response to receiving said request:
granting said lock on said shared resource to a lock holder, and
establishing a lock lease period associated with said lock;
determining, based on information about other resources and processes executing in a system, that said lock lease period associated with said lock needs to be shortened; and
in response to determining that said lock lease period associated with said lock needs to be shortened, shortening said lock lease period associated with said lock;
wherein the step of determining that said lock lease period associated with said lock needs to be shortened comprises one or more of:
determining that said lock lease period needs to be shortened to avoid system deadlocks;
determining that said lock lease period needs to be shortened because a process having a higher priority than said lock holder requested said lock on said shared resource; or
determining that said lock lease period needs to be shortened because a notification of a blocking asynchronous system trap (BAST) function was received.

20. A non-transitory computer-readable storage medium, storing one or more instructions which, when executed by one or more processors, cause performance of steps comprising:
receiving a request for a lock on a shared resource;
in response to receiving said request:
granting said lock on said shared resource to a lock holder, and establishing a lock lease period associated with said lock;

determining, based on information about other resources and processes executing in a system, that said lock lease period associated with said lock needs to be shortened; and in response to determining that said lock lease period associated with said lock needs to be shortened, shortening said lock lease period associated with said lock;

wherein the step of determining that said lock lease period associated with said lock needs to be shortened comprises one or more of:

determining that said lock lease period needs to be shortened to avoid system deadlocks;

determining that said lock lease period needs to be shortened because a process having a higher priority than said lock holder requested said lock on said shared resource; or     determining that said lock lease period needs to be shortened because a notification of a blocking asynchronous system trap (BAST) function was received.

\* \* \* \* \*

UNITED STATES PATENT AND TRADEMARK OFFICE
CERTIFICATE OF CORRECTION

| | |
|---|---|
| PATENT NO. | : 8,990,179 B2 |
| APPLICATION NO. | : 13/721614 |
| DATED | : March 24, 2015 |
| INVENTOR(S) | : Chan et al. |

It is certified that error appears in the above-identified patent and that said Letters Patent is hereby corrected as shown below:

Title page, column 1, under inventors, line 2, delete "Los Angeles," and insert -- Los Altos, --, therefor.

In the specification

In column 1, line 52, delete "some time" and insert -- sometime --, therefor.

In column 5, line 11, delete "system" and insert -- system. --, therefor.

Signed and Sealed this
Third Day of November, 2015

Michelle K. Lee
*Director of the United States Patent and Trademark Office*